United States Patent
Kaneda et al.

(10) Patent No.: US 6,973,738 B2
(45) Date of Patent: Dec. 13, 2005

(54) MEASURING METHOD AND DEVICE, MACHINE TOOL HAVING SUCH DEVICE, AND WORK PROCESSING METHOD

(75) Inventors: Kiyoshi Kaneda, Kanagawa (JP); Yasuhiro Kurahashi, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 173 days.

(21) Appl. No.: 10/168,033

(22) PCT Filed: Jul. 18, 2001

(86) PCT No.: PCT/JP01/06253

§ 371 (c)(1),
(2), (4) Date: Jun. 17, 2002

(87) PCT Pub. No.: WO02/32620

PCT Pub. Date: Apr. 25, 2002

(65) Prior Publication Data

US 2002/0189120 A1 Dec. 19, 2002

(30) Foreign Application Priority Data

Oct. 16, 2000 (JP) .......................... 2000-315713

(51) Int. Cl.[7] .............................................. G01D 21/00
(52) U.S. Cl. ............................... 33/636; 33/628; 33/639
(58) Field of Search .......................... 33/201, 613, 623, 33/628, 636, 638, 639, 642, 832, 833

(56) References Cited

U.S. PATENT DOCUMENTS

| | | | |
|---|---|---|---|
| 3,781,999 A | * 1/1974 | Colangelo | ................ 33/639 |
| 3,920,971 A | * 11/1975 | Bevis et al. | ................ 33/201 |
| 4,016,784 A | * 4/1977 | Brown | ................ 82/118 |
| 4,750,272 A | 6/1988 | Caddell | |
| 4,890,421 A | * 1/1990 | Moore et al. | ................ 33/642 |
| 5,358,364 A | * 10/1994 | Kall | ................ 33/638 |

FOREIGN PATENT DOCUMENTS

| | | |
|---|---|---|
| JP | 58-120109 A | 7/1983 |
| JP | 60-127958 A | 7/1985 |
| JP | 8-229776 A | 9/1996 |
| JP | 9-131642 A | 5/1997 |
| JP | 9-155693 A | 6/1997 |

* cited by examiner

Primary Examiner—Christopher W. Fulton
Assistant Examiner—Madeline Gonzalez
(74) Attorney, Agent, or Firm—Paul & Paul

(57) ABSTRACT

A method of measuring the position of the cutting edge of a tool T mounted to a spindle 14 of an NC machine tool includes steps of measuring the dimension of the center of an end surface of the spindle 14 relative a reference position in a machine coordinate system of the machine tool in the axial directions of the X-, Y- and Z-axes, measuring the dimensions of the position of the cutting edge of the tool T mounted to the spindle 14 relative to the center of the end surface of the spindle 14 in the axial directions of the X-, Y- and Z-axes, obtaining the dimensions of the position of the cutting edge of the tool T mounted to the spindle 14 relative to the reference position in the machine coordinate system through a calculation on the basis of the relative dimensions of the center of the end surface of the spindle 14 in the machine coordinate system and the dimensions of the position of the cutting edge of the tool T mounted to the spindle 14.

9 Claims, 8 Drawing Sheets

MEASURING METHOD AND DEVICE, MACHINE TOOL HAVING SUCH DEVICE, AND WORK PROCESSING METHOD

FIELD OF THE INVENTION

The invention relates to a method of and an apparatus for measuring the position of a measurement point of a measuring target, and in particular to a method of and an apparatus for measuring the position of the cutting edge of a tool mounted to a spindle for the purpose of precise finish with an NC machine tool such as an NC milling machine and machining center, and to a machine tool having the apparatus and a method of machining a workpiece.

BACKGROUND ART

In the field of the machine tool, the requirements of the accuracy of finishing have been increased year by year, and recently an accuracy of submicron order is often required. In order to improve the accuracy of finishing, machine tools are developed so as to measure the dislocation of the tool relative to the spindle and the thermal expansion in the spindle.

As a first prior art, Japanese Unexamined Patent Publication (Kokai) No. 11-138392 discloses an NC machine tool which can measure, during the rotation of a tool, the cutting edge of the tool, the tool diameter, the tool length and the tool shape. The NC machine tool is provided with an optical tool measuring instrument which generates a fine linear beam between a projector and a receiver. A tool is mounted to the spindle, moved relative to the table in X-, Y- and X-axial directions to approach the beam in a predetermined direction. The center of the tool, the tool diameter and the tool length, defined in the NC program for the NC machine tool, are corrected on the basis of the X-, Y- and Z coordinates when the tool intercepts the beam.

As a second prior art, Japanese Unexamined Patent Publication (Kokai) No. 10-309653 discloses a machine tool in which the position of the cutting edge of a tool rotating in a high speed is accurately measured. In this machine tool, a reference block is fixed onto a top of a table. A displacement gauge, for measuring the distance to the reference block, is provided to a spindle housing. Another displacement gauge, for measuring the distance of the spindle end or a tool holder relative to the housing, is provided to the spindle housing. The displacement of the end of the spindle housing and the displacement of the spindle relative to the end of the spindle housing are obtained to correct the change in the position of the cutting edge of a tool.

In the first prior art, the position of the center of a tool, the tool diameter and the tool length is measured by the beam in non-contacting manner during the rotation of the tool to correct the machining program. However, the optical measurement has a problem that because the configuration of the tool tip is complex, the measured point is not clear in a the rotating tool and the accuracy of measurement is low. Another type of non-contacting distance measurement using such as a electrostatic capacity or eddy current also cannot solve the problem of the low measurement accuracy because the measure point is not clear in a rotating tool In the second prior art, there is a problem that only the change in the tool length in the direction of the axis of the spindle or Z-axis can be measured but the apparent increase in the tool diameter due to a tilt or an offset of a tool relative to the spindle and the decrease in the tool diameter due to wear of the cutting edge of a tool cannot be measured.

SUMMARY OF THE INVENTION

The invention is directed to solve the above-described problems of the prior art and the object of the invention is to provide a method of and an apparatus for measuring the position of the cutting edge of a tool mounted to the end of the spindle of an NC machine tool with a high accuracy.

Further, the object of the invention is to provide a method of and an apparatus for measuring the position of a measurement point of a measuring target machine coordinate system with a high accuracy.

Further, the object of the invention is to provide a machine tool improved to measure the position of the cutting edge of a tool mounted to the end of the spindle.

Further, the object of the invention is to provide a method of machining a workpiece with a high accuracy by measuring the position of the cutting edge of a tool mounted to the end of the spindle.

Further, the object of the invention is to provide a tool presetter which can measure the tool length and tool diameter.

According to the invention, there is provided a method of measuring the position of a cutting edge of a tool mounted to a spindle of an NC machine tool, comprising the steps of:

measuring the dimension of a reference position of the spindle relative a reference coordinate position of the machine tool in at least an axial direction of the X-, Y- and Z-axes during when the spindle rotates or is stationary after the rotation;

measuring the dimension of the position of a cutting edge of a tool mounted to the spindle relative to the reference position of the spindle in the axial direction when the spindle rotates or is stationary; and obtaining the dimension of the position of a cutting edge of a tool mounted to the spindle relative to the reference coordinate position through a calculation on the basis of the relative dimensions measured in the previous two steps.

Further according to the invention, there is provided a method of measuring the position of a cutting edge of a tool mounted to a spindle of an NC machine tool, comprising the steps of:

measuring the coordinate position in the coordinate system of the machine tool when the reference position of the spindle is positioned at a predetermined position and when the spindle rotates or is stationary after the rotation;

measuring the position of a cutting edge of a tool mounted to the spindle relative to the reference position of the spindle when the spindle rotates or is stationary after the rotation;

obtaining the coordinate position of a cutting edges of the tool mounted in the coordinate system through a calculation on the basis of the relative dimensions measured in the previous two steps.

Further according to the invention, there is provided a method of measuring the position of a cutting edge of a tool mounted to a spindle of an NC machine tool, comprising the steps of:

measuring the coordinate position in the coordinate system of the machine tool when the reference position of the spindle is positioned at a predetermined position and when the spindle rotates or is stationary after the rotation;

measuring the position of a cutting edge of a tool mounted to the spindle relative to the reference position of the spindle when the spindle rotates or is stationary after the rotation;

measuring the changes in the position of the reference position of the spindle relative to the spindle housing of the machine tool obtaining the coordinate position of a cutting edges of the tool mounted in the coordinate system through a calculation on the basis of the relative dimensions measured in the previous three steps.

Further according to the invention, there is provided a method of measuring a measurement the coordinate position of a measuring target point of a measuring object in a machine coordinate system by using contacting or non-contacting displacement measuring means, comprising the steps of:

moving the measuring target point of the measuring object into the measurement range of the displacement measuring means by the relative movement between the displacement measuring means and the measuring object along a direction same as a measurable direction of the displacement measuring means;

detecting the output value of the displacement measuring means and the coordinate position in the machine coordinate system at a predetermined measurement timing;

obtaining the coordinate position of the measuring target point of the measuring object in the machine coordinate system relative to the reference position of the displacement measuring means through a calculation on the basis of the detected output value of the displacement measuring means and the coordinate position in the machine coordinate system.

Further according to the invention, there is provided a method of measuring the coordinate position of a reference position of a spindle or a reference position of a masterpiece having a known size mounted to a spindle by using contacting or non-contacting displacement measuring means attached to an constitutional member movable relative to the spindle of an NC machine tool, comprising the steps of:

moving the reference position of the spindle or the reference position of the masterpiece attached to the spindle into the measurable range of the displacement measuring means by the relative movement along a direction same as a measurable direction of the displacement measuring means;

detecting the output value of the displacement measuring means and the coordinate position in the machine coordinate system of the NC machine tool at a predetermined measurement timing;

obtaining the coordinate position in the coordinate system of the reference position of the spindle or the reference position of the masterpiece attached to the spindle relative to the reference position of the displacement measuring means through a calculation on the basis of the detected output value of the displacement measuring means and the coordinate position in the machine coordinate system.

Further according to the invention, there is provided a method of measuring the coordinate position of a measuring target cutting edge of a tool mounted to a spindle by using contacting or non-contacting displacement measuring means attached to an constitutional member movable relative to the spindle of an NC machine tool, comprising the steps of:

moving the measuring target cutting edge of the tool into the measurable range of the displacement measuring means by the relative movement along a direction same as a measurable direction of the displacement measuring means;

detecting the output value of the displacement measuring means and the coordinate position in the machine coordinate system of the NC machine tool at a predetermined measurement timing;

obtaining the coordinate position in the coordinate system of the measuring target cutting edge of the tool relative to the reference position of the displacement measuring means through a calculation on the basis of the detected output value of the displacement measuring means and the coordinate position in the machine coordinate system.

Further according to the invention, there is provided a method of measuring the coordinate position of a measurement point of a workpiece or a reference position of a workpiece fixture movable relative to the spindle side by using contacting or non-contacting displacement measuring means provided on a spindle or a spindle head of an NC machine tool, comprising the steps of:

moving the measurement point of a workpiece or the reference position of the workpiece fixture into the measurable range of the displacement measuring means by the relative movement along a direction same as a measurable direction of the displacement measuring means;

detecting the output value of the displacement measuring means and the coordinate position in the machine coordinate system of the NC machine tool at a predetermined measurement timing;

obtaining the coordinate position in the coordinate system of the measurement point of a workpiece or the reference position of the workpiece fixture relative to the reference position of the displacement measuring means through a calculation on the basis of the detected output value of the displacement measuring means and the coordinate position in the machine coordinate system.

Further according to the invention, there is provided a method of measuring the tool length of a tool mounted to a spindle by using contacting or non-contacting displacement measuring means provided a constitutional member movable in Z-axis relative to the spindle of an NC machine tool, the displacement measuring means being capable of measuring the displacement in Z-axis direction, the method comprising the steps of:

moving the reference position of the spindle or a reference position of a masterpiece having a known length and mounted to the spindle into the measurable range of the displacement measuring means by the relative movement;

preliminary detecting the output value of the displacement measuring means and the coordinate position of Z-axis in the machine coordinate system of the NC machine tool at a predetermined measurement timing;

storing the detected value and the value of the length of the masterpiece as calibration data or storing calibration data calculated on the basis of the detected value and the value of the length of the masterpiece;

moving the cutting edges of a tool to be measured, the tool being mounted to the spindle, into the measurable range of the displacement measuring means by the relative movement;

detecting the output value of the displacement measuring means and the coordinate position of Z-axis in the machine coordinate system of the NC machine tool at a predetermined measurement timing;

obtaining the tool length of the tool relative to the reference position of the spindle or the reference position of the masterpiece attached to the spindle through a calculation on the basis of the stored calibration data, the detected output value of the displacement measuring means concerning the tool to be measured and the coordinate position of Z-axis in the machine coordinate system of the NC machine tool.

Further according to the invention, there is provided a method of measuring the tool diameter of a tool mounted to a spindle by using contacting or non-contacting displacement measuring means mounted to a constitutional member movable relative to a spindle of an NC machine tool, the displacement measuring means being capable of measuring the displacements in X- and Y-axes directions, the method comprising the steps of:

moving a side face of a masterpiece having a known diameter and mounted to the spindle into the measurable range of the displacement measuring means by the relative movement;

preliminary detecting the output value of the displacement measuring means and the coordinate position of X- or Y-axis in the machine coordinate system of the NC machine tool at a predetermined measurement timing;

storing the detected value and the value of the diameter of the masterpiece as calibration data or storing calibration data calculated on the basis of the detected value and the value of the diameter of the masterpiece;

moving the measurement point of the cutting edges of a tool to be measured, the tool being mounted to the spindle, into the measurable range of the displacement measuring means by the relative movement;

detecting the output value of the displacement measuring means and the coordinate position of X- or Y-axis in the machine coordinate system of the NC machine tool at a predetermined measurement timing;

obtaining the diameter of the cutting edge of the tool through a calculation on the basis of the stored calibration data, the detected output value of the displacement measuring means concerning the tool to be measured and the coordinate position of X- or Y-axis in the machine coordinate system of the NC machine tool.

Further according to the invention, there is provided a method of obtaining abrasion loss in the tool length or tool diameter through a calculation on the basis of the difference, before and after a progress of a machining process, in the tool lengths or diameters of the cutting edge, which are obtained by the measuring method according to claim 8 or 9.

Further according to the invention, there is provided a method of measuring the distance between two measuring surfaces of a workpiece movable relative to a spindle or a spindle head by using contacting or non-contacting displacement measuring means provided on the spindle or the spindle head of an NC machine tool, the displacement measuring means being capable of measuring the displacements in X- and Y-axes directions, the method comprising the steps of:

providing the displacement measuring means so as to be able to measure the displacement in the direction of distance to be measured;

moving the measuring surfaces into the measurable range of the displacement measuring means by the relative movement;

detecting the output value of the displacement measuring means and the coordinate position in the coordinate system of the NC machine tool at a predetermined measurement timing;

obtaining the distance between the two surfaces in the workpiece through a calculation on the basis of the detected output values of the displacement measuring means at the two measuring surfaces and the coordinate position.

The step of detecting the output value of the displacement measuring means and the coordinate position in the coordinate system at the predetermined timing may include a step of detecting he output value of the displacement measuring means and the coordinate position in the coordinate system after the relative movement of the displacement measuring means is stopped within the measurement range.

The step of detecting the output value of the displacement measuring means and the coordinate position in the coordinate system at the predetermined timing may include a step of detecting he output value of the displacement measuring means and the coordinate position in the coordinate system when the relative movement of the displacement measuring means is executed within the measurement range.

The coordinate position in the coordinate system detected at the predetermined timing may be selected from the value of the indication of a feed shaft position reading means provided on a feed shaft, an NC command value for a feed shaft or a position obtained from an NC command value for a feed shaft added with a position deviation obtained from a servo-control unit.

Further according to the invention, there is provided an apparatus for measuring the position of a cutting edge of a tool mounted to a spindle of an NC machine tool, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle; and calculation means for calculating the coordinate position of the cutting edge of a tool in the coordinate system on the basis of the output values of the feed shaft position reading means, the first shaft reference position measuring means and the tool cutting edge position measuring means.

The tool cutting edge position measuring means may comprise a contacting or non-contacting displacement measuring sensor.

Further according to the invention, there is provided an apparatus for measuring the position of a cutting edge of a tool mounted to a spindle of an NC machine tool, comprising:

feed shaft position reading means for reading the coordinate position of the coordinate system of the machine tool;

position measuring means, provided on a constitutional member movable relative to the spindle, for measuring the coordinate position of the reference position of the spindle in the coordinate system and the position of a cutting edge of a tool relative to the reference position of the spindle; and calculation means for calculating the coordinate position of the cutting edge of a tool in the coordinate system on the basis of the output values of the feed shaft position reading means and the position measuring means.

Further according to the invention, there is provided an apparatus for measuring the position of a cutting edge of a tool mounted to a spindle of an NC machine tool, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

second shaft reference position measuring means, provided on a spindle housing of the NC machine tool, for measuring the changes in the position of the reference position of the spindle relative to the spindle housing during the rotation; and calculation means for calculating the coordinate position of the cutting edge of a tool in the coordinate system on the basis of the output values of the feed shaft position reading means, the first shaft reference position measuring means, the tool cutting edge position measuring means and the first shaft reference position measuring means.

Further according to the invention, there is provided an apparatus for measuring the coordinate position of measuring surface of a target by using the displacement measuring means, comprising:

contacting or non-contacting displacement measuring means which can measure the displacement at least one axial direction of X-, Y- and Z-axis;

coordinate position sensor means for detecting the coordinate position of the coordinate system of the relative movement between the measuring target point of the measuring object the displacement measuring means; and calculating means for obtaining the coordinate position in the coordinate system of the measuring target point of the measuring object relative to the reference position of the displacement measuring means through a calculation on the basis of the output value of the displacement measuring means and the output value of the coordinate position sensor means at a predetermined measurement timing after the measuring target point of the measuring object is moved into the measurable range of the displacement measuring means by the relative movement along a direction same as a measurable direction of the displacement measuring means.

Further according to the invention, there is provided an apparatus for measuring, wherein the coordinate position sensor means determines the value of the indication of a feed shaft position reading means provided on a feed shaft, an NC command value for a feed shaft or a position obtained from an NC command value for a feed shaft added with a position deviation obtained from a servo-control unit as the coordinate position of the coordinate system of the relative movement.

Further according to the invention, there is provided a machine tool for machining a workpiece with a numerically controlled relative movement between a spindle to which a tool is mounted and a table to which the workpiece is fixed, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

calculation means for calculating the coordinate position of the cutting edge of a tool in the coordinate system on the basis of the output values of the feed shaft position reading means, the first shaft reference position measuring means and the tool cutting edge position measuring means; and correcting means for correcting the numeric control command on the basis of the coordinate position of the cutting edge of a tool in the coordinate system calculated by the calculating means.

Further according to the invention, there is provided a machine tool for machining a workpiece with a numerically controlled relative movement between a spindle to which a tool is mounted and a table to which the workpiece is fixed, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

workpiece reference position measuring means for measuring the coordinate position of the reference position of the workpiece in the coordinate system;

calculation means for calculating the position of a cutting edge of a tool relative to the reference position of the workpiece on the basis of the output values of the feed shaft position reading means, the first shaft reference position measuring means and the tool cutting edge position measuring means; and correcting means for correcting the numeric control command on the basis of the position of a cutting edge of a tool relative to the reference position of the workpiece calculated by the calculating means.

Further according to the invention, there is provided a machine tool for machining a workpiece with a numerically controlled relative movement in three axial directions of X-, Y- and Z-axes between a spindle to which a tool is mounted and a table to which the workpiece is fixed, comprising:

contacting or non-contacting displacement measuring means which can measure the displacement of a measuring target point of the spindle, the tool or the workpiece at least one axial direction of X-, Y- and Z-axis;

coordinate position sensor means for detecting the coordinate position of the coordinate system of the relative movement between the measuring target point the displacement measuring means; and calculating means for detecting the output value of the displacement measuring means and the output value of the coordinate position sensor means at a predetermined measurement timing after the measuring target point of the measuring object is moved into the measurable range of the displacement measuring means by the relative movement along a direction same as a measurable direction of the displacement measuring means to obtain the coordinate position in the coordinate system of the measuring target point relative to the reference position of the displacement measuring means through a calculation on the basis of the detected output values.

Further according to the invention, there is provided a method of machining a workpiece into a desired shape with an NC machine tool which numerically controls the relative movement between a spindle to which a tool is mounted and a table to which the workpiece is fixed relatively to each other, the method comprising the steps of:

measuring the coordinate position in the machine coordinate system when a reference position of the spindle is positioned at a predetermined position and when the spindle rotates or is stationary after the rotation;

measuring the position of a cutting edge of a tool mounted to the spindle relative to the reference position of the spindle when the spindle rotates or is stationary;

obtaining the coordinate position of the cutting edges of the tool in the coordinate system through a calculation on the basis of the values measured in the previous two steps; and obtaining a correction for the numeric control command for machining the workpiece on the basis of the coordinate position of the cutting edge of the tool mounted to the spindle in the coordinate system.

Further according to the invention, there is provided a method of machining a workpiece into a desired shape with an NC machine tool which numerically controls the relative movement in three axial directions of X-, Y- and Z-axes between a spindle to which a tool is mounted and a table to which the workpiece is fixed relatively to each other, the method comprising the steps of:

moving the measuring target point of the spindle, the tool or the workpiece into the measurement range of the displacement measuring means through the relative movement by using contacting or non-contacting displacement measuring means along a direction same as a measurable direction of the displacement measuring means;

detecting the output value of the displacement measuring means and the coordinate position in the coordinate system of the relative movement at a predetermined measurement timing;

obtaining the coordinate position of the measuring target point in the coordinate system relative to the reference position of the displacement measuring means through a calculation on the basis of the detected output value and the coordinate position of the coordinate system to machine the workpiece.

Further according to the invention, there is provided a tool presetter for measuring and registering the tool length of diameter of the cutting edges of a tool mounted to a spindle of an NC machine tool, comprising:

displacement measuring means which is movable relative to a tool mounting portion and capable of measuring the displacements in X-, Y- and X-axial directions;

feed shaft position reading means for reading the coordinate position of the coordinate system of the relative movement;

calculating means for detecting the output value of the displacement measuring means and the output value of displacement measuring means at a predetermined measurement timing after a reference position of a masterpiece having a known size mounted to the tool mounting portion, the cutting edge of the tool mounted to the tool mounting portion or the outermost side surface of the tool is moved into the measurable range of the displacement measuring means by the relative movement and for obtaining the coordinate position in the coordinate system of the reference position of the masterpiece, the cutting edges of the tool or the outermost side surface of the tool on the basis of the detected output values and the value of the size of the masterpiece and for calculating the tool length or tool diameter of the tool.

BEST MODE FOR CARRYING OUT THE INVENTION

A first embodiment of the invention will be described below with reference to the accompanying drawings.

Figure 1:
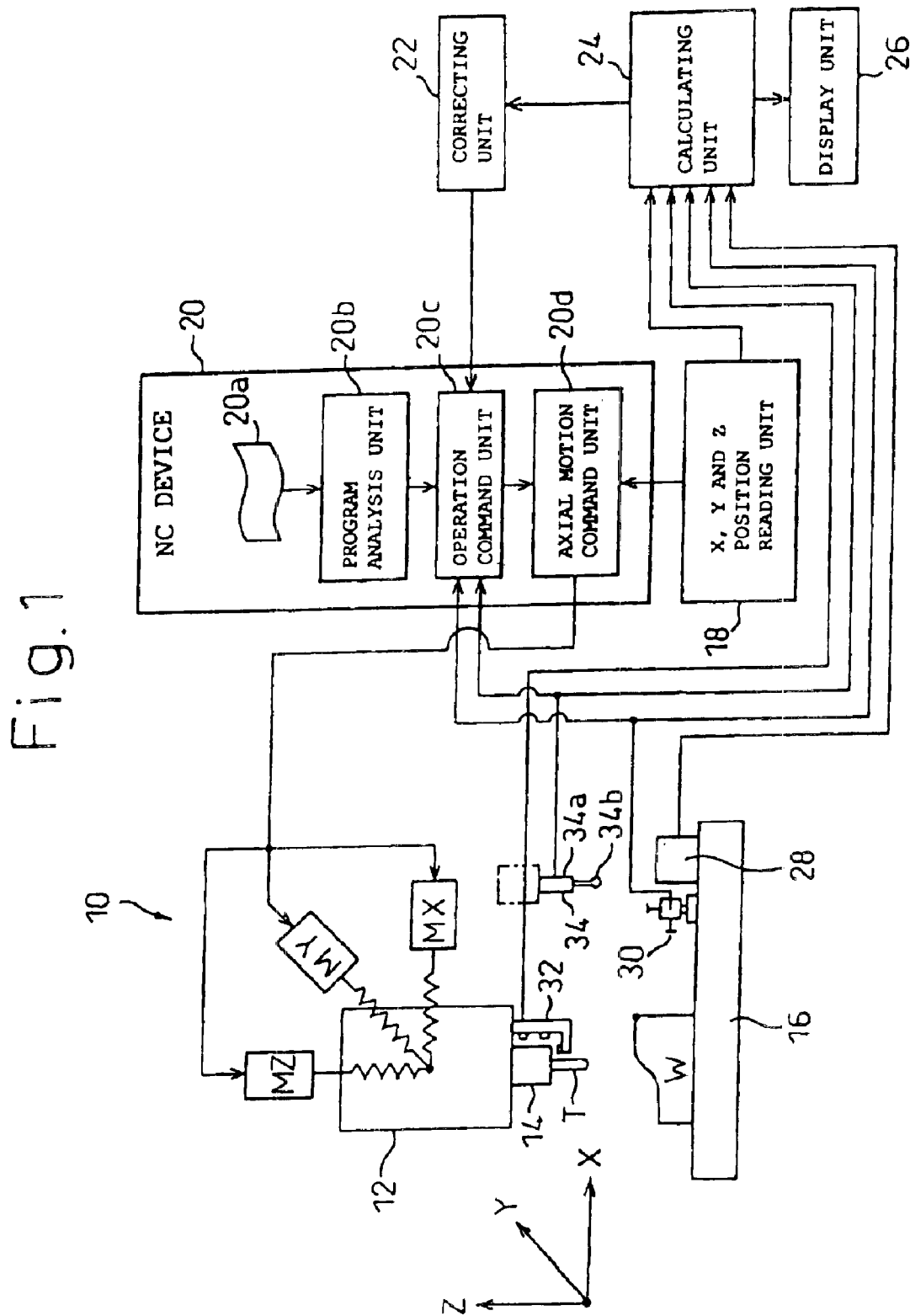
FIG. 1 is block diagram showing the configuration of an NC machine tool according to an embodiment of the invention.

In FIG. 1, a machine tool unit 10 of an NC machine tool according to the first embodiment includes a spindle unit 12 having a spindle 14 rotatably supported and built in a spindle housing. The spindle unit 12 is movable in three orthogonal directions of X, Y and Z relatively to a table 16 with a workpiece W fixed thereon by an X-axis feed motor $M_X$, a Y-axis feed motor $M_Y$ and a Z-axis feed motor $M_Z$, respectively. A tool T is mounted at the forward end of the spindle 14. The workpiece W is cut by rotating the tool T and machined to a desired shape while being moved along the X-, Y- and Z-axes relatively.

An NC device 20 for controlling the relative movement of the spindle unit 12 and the table 16 of the machine tool unit 10 along the X-, Y- and Z-axes includes, as main component elements, a program storage unit 20a for storing a machining program, a tool edge position measuring program, etc., a program analysis unit 20b for analyzing the program stored in the program storage unit 20a, an operation command unit 20c for generating a sequential move command in accordance with the program analyzed and an axial motion command unit 20d having a servo amplifier, for example, for driving the X-axis feed motor $M_X$, the Y-axis feed motor $M_Y$ and the Z-axis feed motor $M_Z$ in accordance with the motion command. The position of the spindle unit 12 relative to the table 16 is measured by each of X, Y and Z position reading units 18 such as a digital scale arranged on each axis of the machine tool unit 10 and fed back each moment to the axial motion command unit 20d. A display unit 26 displays the reading of the X, Y and Z position reading units 18 and the various values calculated by an calculating unit 24.

According to the first embodiment, a first spindle reference position measuring unit 28 and a tool edge position measuring unit 30 are provided for measuring the cutting edge position of the tool T mounted at the forward end of the spindle 14.

Figure 2:
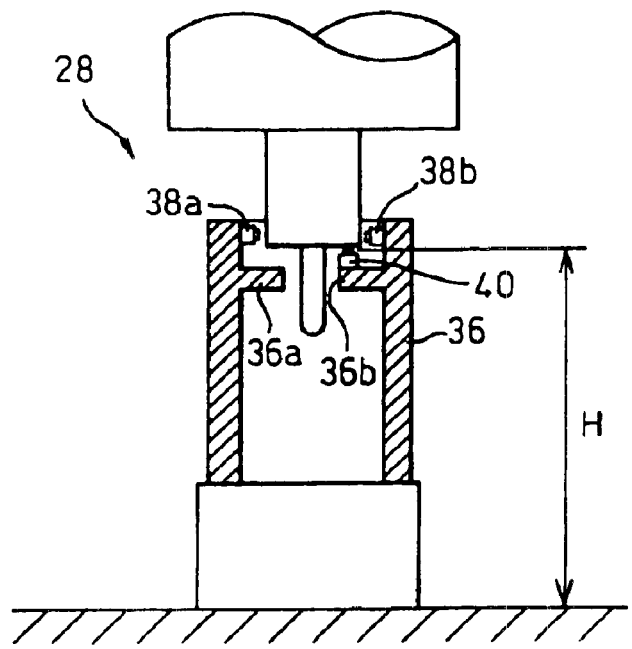
FIG. 2 is a section of first spindle reference position measuring means.
Figure 3:
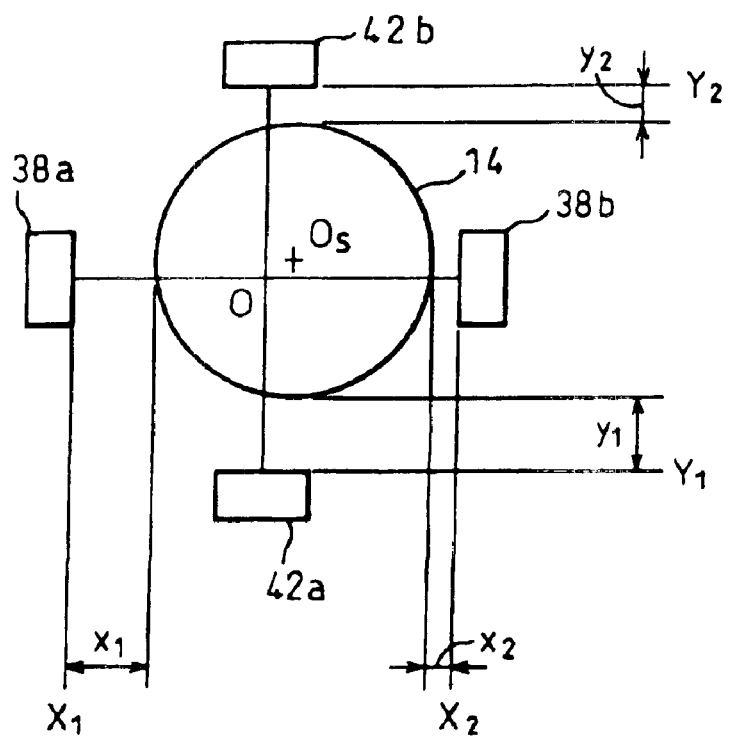
FIG. 3 is a schematic illustration for explaining the method of obtaining the coordinate of the center of the end of the spindle in which the first spindle reference position measuring means of FIG. 2 is viewed form the top thereof.

Referring to FIGS. 2 and 3, the first spindle reference position measuring unit 28 includes a plurality of distance sensors 38a, 38b, 40, 42a, 42b (FIG. 3) fixed on a base frame 36. The distance sensors 38a, 38b, 40, 42a, 42b each can be configured of, for example, a non-contacting distance sensor of eddy current type or electrostatic capacitance type. The base frame 36 is a cylindrical or prismatic hollow member composed of a material such as invar having a small coefficient of thermal expansion, and a bottom wall 36a is formed at a predetermined height on the inner surface thereof. The bottom wall 36a has a central opening 36b. A tool T is inserted into the central opening 36b for measurement, as shown in FIG. 2. Therefore, the bottom wall 36a is arranged under the bottom wall 36a at such a height as to form a space capable of accommodating the forward end of the tool T at least at the time of measurement. The first spindle reference position measuring unit 28 is accurately set in position fixedly on the upper surface of a component member adapted for relative movement along X-, Y- and Z-axes with respect to the spindle 14, or according to the first embodiment shown in FIG. 1, on the upper surface of the table 16 of the machine tool unit 10, for example.

A pair of X-direction distance sensors 38a, 38b and a pair of Y-direction distance sensors 42a, 42b for measuring the X-axis distance and the Y-axis distance, respectively, with respect to the side surface of the spindle 14 stopped or in rotation, are arranged in opposed relation in X and Y directions, respectively, on the inner surface adjoining the upper end opening of the base frame 36. The center coordinate O ($X_C$, $Y_C$) of the first spindle reference position measuring unit 28 is represented by the intersection between a line segment connecting the centers of the measurement surfaces of the X-direction distance sensors 38a, 38b and a line segment connecting the centers of the measurement surfaces of the Y-direction distance sensors 42a, 42b (FIG. 3), and is determined by the following equations.

$$X_C = \frac{1}{2}(X_1 + X_2)$$

$$Y_C = \frac{1}{2}(Y_1 + Y_2)$$

where $X_1$ is the X coordinate of the measurement surface of the X-direction distance sensor 38a, which measurement surface is directed in position direction along X-axis, $X_2$ is the X coordinate of the measurement surface of the X-direction distance sensor 38b, which measurement surface is directed in negative direction along X-axis, $Y_1$ is the Y coordinate of the measurement surface of the Y-direction distance sensor 42a, which measurement surface is directed in positive direction along Y-axis, and $Y_2$ is the Y coordinate of the measurement surface of the Y-direction distance sensor 42b, which the measurement surface is directed in negative direction along Y-axis.

Further, a Z-direction distance sensor 40 for measuring the Z-axis distance with respect to the end surface of the spindle stopped or in rotation is arranged on the upper surface of the bottom wall 36a of the base frame 36. More specifically, the Z-direction distance sensor 40 is arranged with the measurement surface thereof at a predetermined height, or according to this embodiment, at the height H from the upper surface of the table 16.

Figure 4:
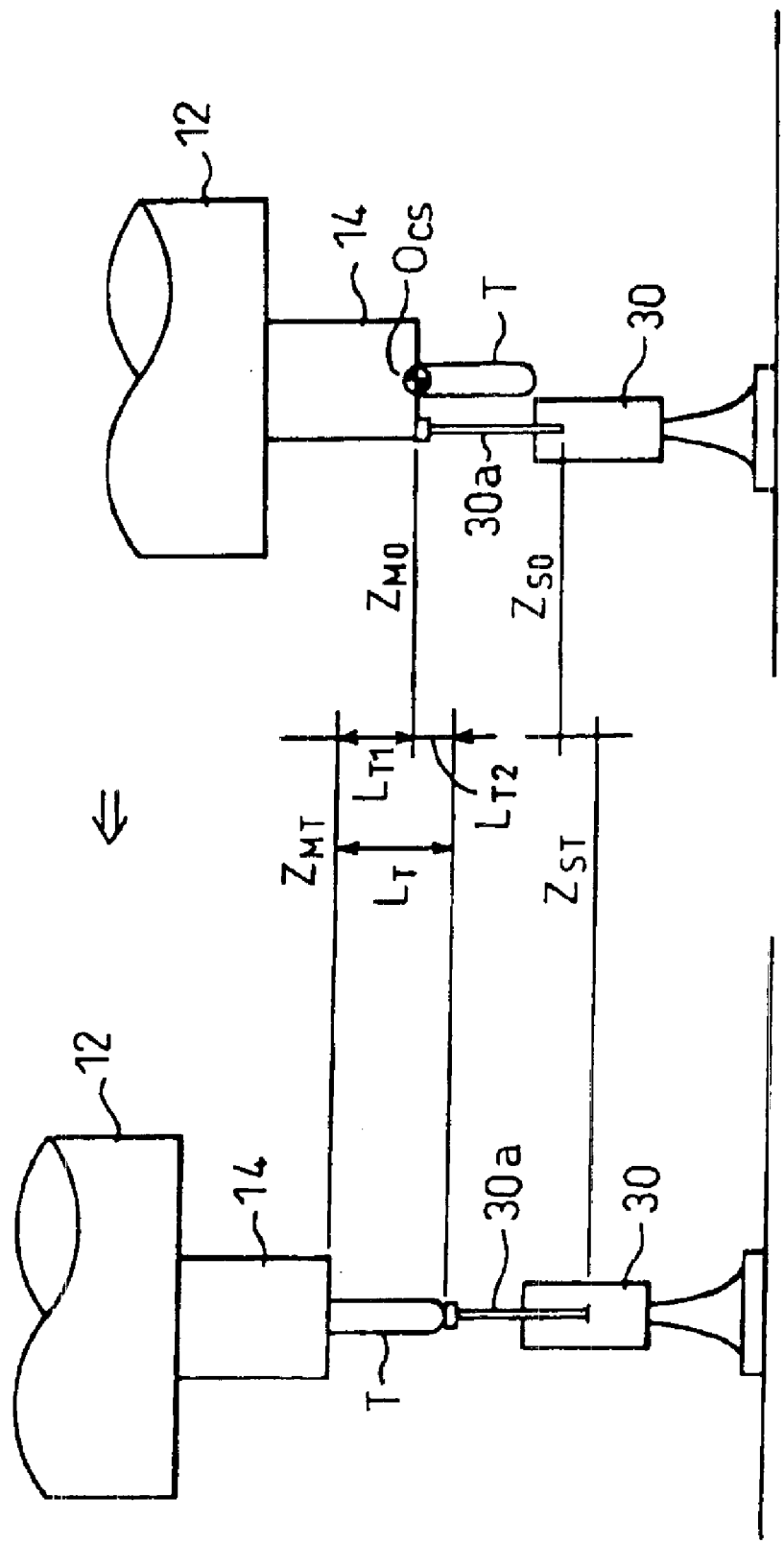
FIG. 4 is an illustration for explaining the method of measuring the tool length or the position of the cutting edge of a tool in Z-axis.
Figure 5:
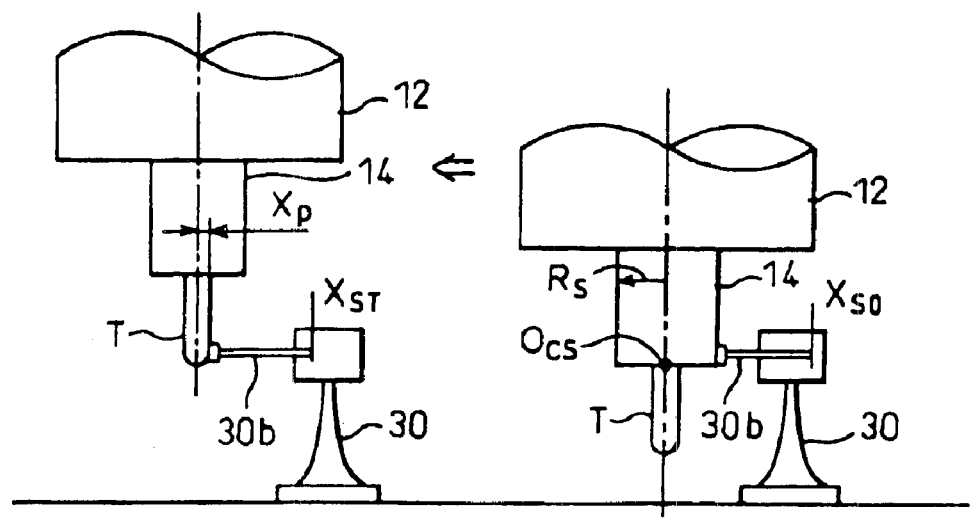
FIG. 5 is an illustration for explaining the method of measuring the tool diameter of the cutting edges at the end of a tool.

Referring to FIGS. 4 and 5, the tool edge position measuring unit 30 is a contacting displacement sensor and includes measuring probes oriented along X-, Y- and Z-axes. These displacement sensors can specifically include a distance measuring unit such as an optical scale, a magnetic scale or a differential transformer. In FIGS. 4 and 5, only a Z-axis measuring probe 30a and an X-axis measuring probe 30b oriented along Z and X axes, respectively, are shown for the tool edge position measuring unit 30. Actually, however, a Y-axis measuring probe oriented along Y-axis is also provided. Also, in spite of the fact that the tool edge position measuring unit 30 is shown to consist of only one measuring instrument in FIG. 1, a measuring instrument can alternatively be arranged along each of X-, Y- and Z-axes, as shown in FIGS. 4 and 5. Further, the X-axis measuring probe 30b of the tool edge position measuring unit 30 is oriented in one direction (rightward in FIG. 5) along X-axis in FIG. 5. Preferably, however, measurement is possible from both directions along X-axis with respect to the tool T. For this purpose, a pair of displacement sensors can be arranged in opposed relation to each other along X-axis or a single displacement sensor can be adapted to rotate by 180 degrees around the rotation center along Z-axis. This is also the case with the Y-axis displacement sensor. The tool edge position measuring unit 30 may be a non-contacting displacement measuring sensor of laser type, electrostatic capacitance type or eddy current type.

Now, the operation of the first embodiment will be explained.

First, the position of the center $O_{CS}$ on the end surface of the spindle 14 is measured by the first spindle reference position measuring unit 28 as a reference position of the spindle 14 when the spindle 14 is stationary, or preferably, when the spindle 14 is stationary at a predetermined temperature or when the spindle 14 is rotating at a machining speed. In accordance with the tool edge position measuring program stored in the program storage unit 20a, the spindle unit 12 is moved along X-, Y- and Z-axes on the machine coordinate system by an X-axis feed motor $M_X$, a Y-axis feed motor $M_Y$ and a Z-axis feed motor $M_Z$. In this way, the spindle 14 is arranged at a position as shown in FIG. 2 with respect to the first spindle reference position measuring unit 28 in such a manner that the center axis of the spindle 14 coincides with the center O of the first spindle reference position measuring unit 28 on the machine coordinate system.

No matter how accurately the spindle unit 12 is fabricated, however, the inclination or offset of the spindle 14 with respect to the spindle housing cannot be removed completely due to such factors as the temperature change of the machine environment and the thermal effect of the heat generated in the various parts of the machine caused by the high-speed rotation of the spindle 14. Therefore, the actual center coordinate $O_{CS}$ of the spindle end surface fails to coincide with the center of the spindle end surface determined in the machine coordinate system. In such a case, the X-Y coordinate $O_S$ ($X_{CS}$, $Y_{CS}$) of the center axis line of the spindle 14 can be determined from the equations below by measuring the distances between the side surface of the spindle 14 and the X- and Y-direction distance sensors 38a, 38b; 42a, 42b.

$$X_{CS} = \frac{1}{2}((X_1 + x_1) + (X_2 - x_2))$$

$$Y_{CS} = \frac{1}{2}((Y_1 + x_1) + (Y_2 - x_2))$$

where $x_1$ is a measurement of the X-direction distance sensor 38a constituting the distance between the measurement surface of the X-direction distance sensor 38a and the side surface of the spindle 14, $x_2$ is a measurement of the X-direction distance sensor 38b constituting the distance between the measurement surface of the X-direction distance sensor 38b and the side surface of the spindle 14, $y_1$ is a measurement of the Y-direction distance sensor 42a constituting the distance between the measurement surface of the Y-direction distance sensor 42a and the side surface of the spindle 14, and $y_2$ is a measurement of the Y-direction distance sensor 42b constituting the distance between the measurement surface of the Y-direction distance sensor 42b and the side surface of the spindle 14, On the other hand, the coordinate $Z_{ES}$ of the end surface of the spindle 14 along Z-axis is given as $Z_{ES} = H + z_{ES}$, where $z_{ES}$ is a measurement taken by the Z-direction distance sensor 40. Assuming that the first spindle reference position measuring unit 28 is accurately set in position within the desired precision on the machine coordinate system, the deviation Δ of the center $O_{CS}$ of the end surface of the spindle 14 from the machine coordinate system is given by the following equations.

$$\Delta(\Delta X, \Delta Y, \Delta Z) = O_{CS}(X_{CS}, Y_{CS}, Z_{ES}) - (X_C, Y_C, Z_C),$$

$$\Delta X = X_{CS} - X_C = \tfrac{1}{2}(x_1 - x_2),$$

$$\Delta Y = Y_{CS} - Y_C = \tfrac{1}{2}(y_1 - y_2),$$

$$\Delta Z = Z_{ES} - Z_C,$$

where ΔX is the deviation in X direction, ΔY is the deviation in Y direction, ΔZ is the deviation in Z direction, and $Z_C$ is the Z coordinate of the end surface of the spindle 14 in the machine coordinate system (the reading of the X, Y and Z position readers 18 on the Z-direction scale).

In this way, the deviations ΔX, ΔY and ΔZ calculated in the calculating unit 24 are output to a correcting unit 22. These values are stored in the correcting unit 22 as relative values between the reference position of the machine coordinate system and the reference of the spindle of the machine tool.

When the tool is changed or the tool is assumed to have been worn, or preferably when the tool temperature is near that for machining operation, the tool rotation angle position is indexed as required with the spindle stopped while measuring the cutting edge position of the tool T with the tool edge position measuring unit 30 in the following manner.

Referring to FIG. 4, a method of measuring the length (tool length) $L_T$ along the center axis of the tool T will be explained. The tool length $L_T$ is defined as the distance from the end surface of the spindle 14 to the forward end of the tool T.

The tool edge position measuring unit 30 is a contacting displacement measuring unit, and has a measuring probe oriented along each of the X-, Y- and Z-axes as described above. Of these probes, the Z-axis measuring probe 30a oriented along Z-axis is used for measuring the tool length $L_T$. First, the spindle unit 12 is moved along X-, Y- and Z-axes with respect to the table 16 thereby to arrange the end surface of the spindle 14 above the tool edge position measuring unit 30. From this state, the spindle unit 12 is moved downward along Z-axis, and the end surface of the spindle 14 is brought into contact with the Z-axis measuring probe 30a oriented along Z-axis, as shown on the right side of FIG. 4. As a result, the Z-axis measuring probe 30a is moved down along Z-axis, and an electrical signal corresponding to the displacement is sent out each moment to the operation command unit 20c and the calculating unit 24. The signal sent to the operation command unit 20c operates as a skip signal. The operation command unit 20c, upon receipt of the skip signal, sends out a Z motor stop command to the axial motion command unit 20d, with the result that the axial movement of the spindle unit 12 along Z-axis stops. The calculating unit 24 stores the displacement $Z_{SO}$ of the Z measuring probe 30a along Z-axis and the Z coordinate $Z_{MO}$ thereof on the machine coordinate system (the reading of the X, Y and Z position reading units on the scale along Z-axis).

With the tool T mounted on the spindle 14, the spindle unit 12 is moved relatively to the table 16 along X-, Y- and Z-axes in such a manner that the center axis of the spindle 14 coincides with the center axis of the Z-axis measuring probe 30a of the tool edge position measuring unit 30. From this state, the spindle unit 12 is moved down along Z-axis, and as shown on the right side of FIG. 4, the forward end of the tool T is brought into contact with the Z-axis measuring probe 30a oriented along Z-axis. As a result, the Z-axis measuring probe 30a is moved down along Z-axis. An electrical signal corresponding to this displacement, as described above, is sent out each moment to the operation command unit 20c and the calculating unit 20d, so that the operation command unit 20c sends out a Z-axis motor stop command to the axial motion command unit 20d thereby to stop the spindle unit 12. In the process, the calculating unit 24 stores the displacement $Z_{ST}$ of the Z-axis measuring probe 30a along Z-axis and the Z coordinate $Z_{MT}$ on the machine coordinate system through the X, Y and Z position reading units 18. Thus, in FIG. 4, the tool length $L_T$ is given as $$L_T = L_{T1} + L_{T2}(Z_{MT} - Z_{MO}) + (Z_{SO} - Z_{ST})$$

In the case where the axial movement is stopped with the forward end of the tool T in contact with the Z measuring probe 30a, the calculating unit 24 stores the displacement $Z_{ST}$ of the Z-axis measuring probe 30a along Z-axis and the Z coordinate $Z_{MT}$ on the machine coordinate system through the X, Y and Z position reading units 18. This indicates that the position of the tool edge on the machine coordinate system could be defined (determined).

In similar fashion, in the case where the axial movement is stopped with the spindle end surface in contact with the Z measuring probe 30a, the position of the spindle end surface on the machine coordinate system could be defined (determined) by the calculating unit 24. The calculating unit 24 arithmetically determines from the above-mentioned equation the tool length $L_T$, i.e. the distance from the position of the spindle end surface to the tool edge position, based on the positions of the tool edge and spindle end surface on this machine coordinate system.

The detection accuracy is very high, since as described above, the axial movement is stopped with the tool edge and the spindle end surface in contact with the displacement measuring means, and the reading of the displacement measuring means and the reading of the X, Y and Z position reading means are detected. In the conventional method for detecting the reading of the X, Y and Z position reading means by the skip signal generated the moment a touch probe is contacted, the measurement accuracy is deteriorated more, the higher the contacting speed, and therefore the contacting speed is required to be reduced. This is due to the unavoidable problem posed by the support structure of the touch probe and the structure for retrieving the detection signal. In the method using the displacement measuring means according to the invention, on the other hand, the reading of the displacement measuring means and the X, Y and Z displacement measuring means are detected in stationary state, and therefore the measurement accuracy does not depend on the contacting speed. For the machine tool which requires the efficiency of the machining operation improved as far as possible, therefore, the time for measurement which constitutes the non-machining time can be shortened and the measurement with high accuracy is made possible very advantageously.

Now, the method of measuring the diameter of the edge of the tool T will be explained with reference to FIG. 5. The diameter of the edge of the tool T is measured using an X-axis measuring probe 30b and a Y-axis measuring probe (not shown) oriented along X and Y axes, respectively. The description that follows, however, deals only with the case where the tool edge position along X-axis is measured.

First, the spindle unit 12 is moved relatively to the table 16 along X-, Y- and Z-axes in such a manner that the side surface of the forward end portion of the spindle 14 may come into contact with the X-axis measuring probe 30b. From this state, the spindle unit 12 is brought near to the X-axis measuring probe 30b along X-axis so that the side surface of the spindle 14 is brought into contact with the forward end of the X measuring probe 30b. As a result, the X-axis measuring probe 30b is retreated along X-axis, and an electrical signal corresponding to the particular displacement is sent out each moment to the operation command unit 20c and the calculating unit 24. The operation command unit 20c, upon receipt of this signal as a skip signal, sends out an X-axis motor stop command to the axial motion command unit 20d. Thus, the spindle unit 12 stops the movement thereof along X-axis. Under this condition, the calculating unit 24 stores the displacement $X_{SO}$ of the X-axis measuring probe 30b along X-axis and the associated X coordinate $X_{MO}$ thereof on the machine coordinate system.

Then, the spindle unit 12 is moved relatively to the table 16 along X-, Y- and Z-axes in such a manner that the cutting edge of the tool T mounted on the spindle 14 which is to be measured can contact the X-axis measuring probe 30b. From this state, the spindle unit 12 is brought near to the tool edge position measuring unit 30 along X-axis, and the cutting edge of the tool T is brought into contact with the X-axis measuring probe 30b, as shown on the left side of FIG. 5. As a result, the X-axis measuring probe 30b is retreated along X-axis. Under this condition, an electrical signal corresponding to the displacement of the X-axis measuring probe 30b is sent out every moment to the operation command unit 20c and the calculating unit 24. The operation command unit 20c, upon receipt of this signal as a skip signal, sends out an X-axis motor stop command to the axial motion command unit 20d thereby to stop the spindle unit 12. At the same time, the calculating unit 24 stores the displacement $X_{ST}$ of the X-axis measuring probe 30b along X-axis and the associated X coordinate $X_{MT}$ on the machine coordinate system. In this way, the radius $X_P$ of the cutting edge of the tool T as measured from right side in FIG. 5 is given as $$X_P = R_S - ((X_{SO} - X_{MO}) - (X_{ST} - X_{MT}))$$

$$= R_S - ((X_{MT} - X_{MO}) + (X_{SO} - X_{ST}))$$

In the case where $X_{MO} = X_{MT}$, the following equation is obtained.

$$X_P = R_S - (X_{SO} - X_{ST})$$

where $R_S$ is the radius of the spindle 14 which is a known value within the accuracy required for obtaining the desired machining precision.

Figure 6:
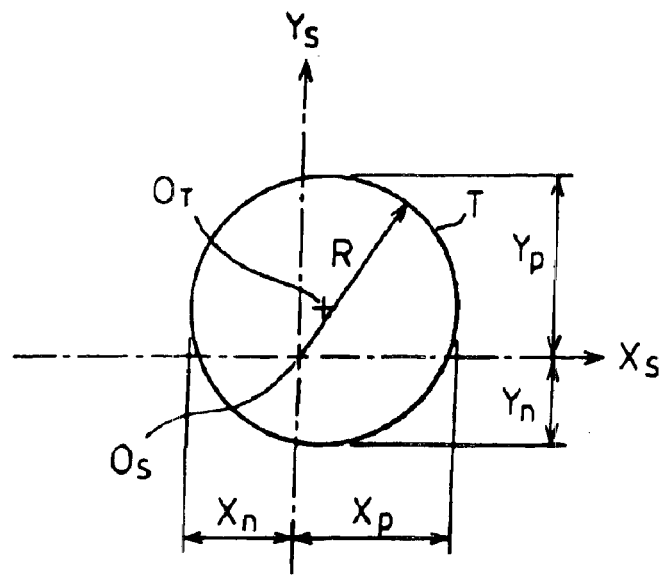
FIG. 6 is an illustration for explaining the method of measuring the tool diameter of the cutting edges at the end of a tool.

In similar fashion, the radius $X_n$ of the cutting edge of the tool T is measured and calculated from the left side along X-axis in FIG. 5. A similar measurement is taken also along Y-axis, so that $Y_p$ and $Y_n$ for the cutting edge of the tool T are measured and calculated along Y-axis as shown in FIG. 6. In FIG. 6, characters $X_S$, $Y_S$ designate the coordinate system of the spindle 14.

The center axis of the tool T mounted at the forward end of the spindle 14 generally fails to coincide with the center axis of the spindle 14. Therefore, the tool T is rotated around the center axis of the spindle 14. In this case, the apparent diameter $D_S$ of the cutting edge of the tool T can be approximated by the following equation.

$$D_S = 2R = 2((\text{Max}(X_n, X_p))^2 + (\text{Max}(Y_n, Y_p))^2)^{1/2}$$

The calculating unit 24 calculates the apparent diameter $D_S$ of the cutting edge of the tool T and outputs it to the correcting unit 22. The correcting unit 22 stores this tool edge diameter $D_S$ and the tool length $L_T$ explained above, as relative sizes of the reference position of the spindle and the tool edge position.

As explained above, the cutting edge position of the tool T can be accurately measured while the spindle 14 is stationary.

Once the cutting edge position of the stationary tool with respect to the reference position has been determined on the machine coordinate system accurately, the displacement of the tool edge position due to the thermal elongation of the spindle 14 heated by the rotation thereof is measured in the manner described below.

The spindle 14 is rotated at high speed by driving a spindle motor (not shown) built in the spindle unit 12. Then, the temperature of the spindle 14 is increased by the heat generated from the spindle motor and the internal friction of the spindle unit 12. After a predetermined time of rotation of the spindle 14, the temperature increase of the spindle 14 generally flattens out to a predetermined temperature, and the thermal elongation of the spindle 14 converges or is settled. The convergence or settlement of the thermal elongation of the spindle 14 can be detected by stopping, at predetermined time intervals after starting the spindle 14, the spindle 14 and measuring the change of the center coordinate $O_{CS}$ of the end surface of the spindle 14 using the first spindle reference position measuring unit 28 and comparing the measurement with the previous measurement or the center coordinate $O_{CS}$ while the spindle 14 is cool. Once the convergence or settlement of thermal elongation of the spindle 14 is detected, the cutting edge position of the tool T is measured by the method described above. The correcting unit 22 generates a correction value based on the value of the cutting edge position of the tool T mounted on the spindle 14 relative to the reference position on the machine coordinate system determined as described, and sends out the correction value thus determined to the operation command unit 20c.

After measurement of the cutting edge position of the tool T and generation of the correction value, the machining process is started in accordance with the machining program stored in the program storage unit 20a. At a predetermined timing or upon the lapse of a predetermined time following the start of the machining process, when the workpiece W or the tool T is changed or several machining steps of a given machining process have been carried out, the center coordinate $O_{CS}$ of the end surface of the spindle 14 is measured with the spindle 14 stopped or in rotation. At the same time, the rotation of the tool T is stopped so that the cutting edge position thereof is measured by the method described above thereby to update the correction value.

As described above, according to this embodiment, the tool edge position with respect to the reference position on the machine coordinate system can be accurately determined by measuring the relative values between the reference position of the machine tool on the machine coordinate system and the reference position of the spindle in stationary state or rotation and the relative values between the reference position of the spindle and the cutting edge position of a stationary tool.

It has been described above that according to the first embodiment, a correction value for the NC device 20 is determined by measuring the relative values between the reference position on the machine coordinate system and the center position of the end surface of the spindle 14 using the first spindle reference position measuring unit 28, and also measuring the relative values between the center position of the end surface of the spindle 14 and the cutting edge position of the tool T using the tool edge position measuring unit 30. In this method, the cutting edge position of the tool T is measured intermittently. Since the end surface of the spindle 14 has a comparatively simple shape, however, the center position of the spindle 14 can be measured continuously even while the workpiece is being machined.

According to a second embodiment described below, the correction value is updated every moment by measuring the displacement of the center position of the spindle 14 while the workpiece is being machined.

Figure 7:
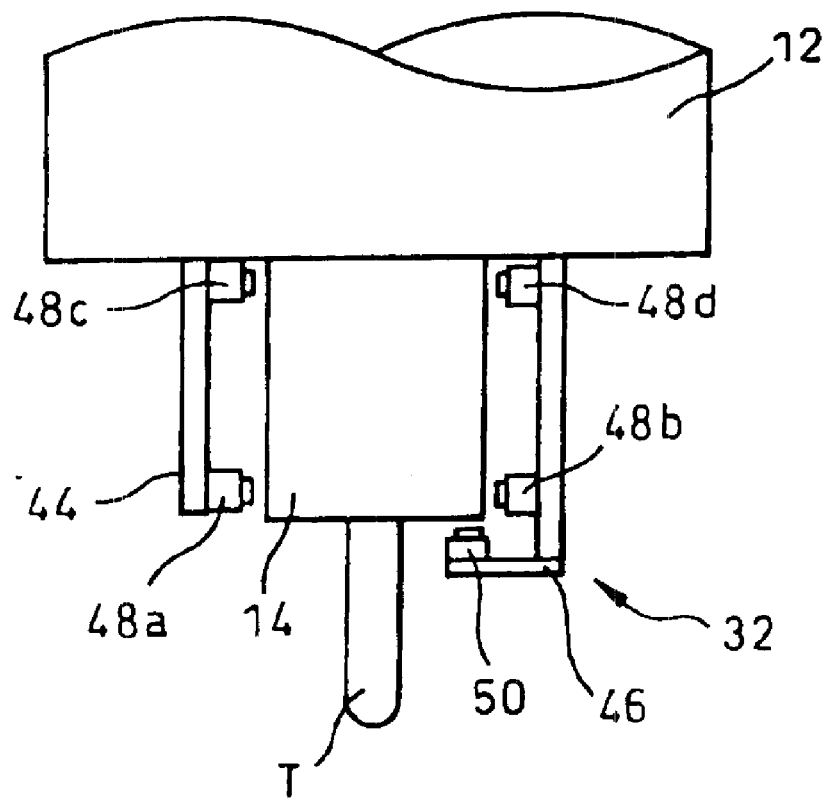
FIG. 7 is a section of second spindle reference position measuring means.

Referring to FIGS. 1 and 7, according to the second embodiment, the machine tool unit 10 includes a second spindle reference position measuring unit 32 in addition to the first spindle reference position measuring unit 28 and the tool edge position measuring unit 30. The second spindle reference position measuring unit 32 includes a frame unit 44 mounted on the end surface of the housing of the spindle unit 12 adjoining the forward end portion of the spindle 14 and a plurality of distance sensors 48a, 48b, 48c, 48d, 50 mounted on the inside of the frame unit 44. A support portion 46 extending radially inward of the spindle 14 is arranged at the forward end (the lower end in the drawing) of the frame unit 44. Also, the frame unit 44 is so shaped as not to adversely affect the measurement of the center position $O_{CS}$ of the end surface of the spindle 14 by the first spindle reference position measuring unit 28. Two pairs of X-axis distance sensors 48a to 48d for measuring the X-axis distance with respect to the side surface of the spindle 14 in rotation and two pairs of Y-axis distance sensors (not shown) for measuring the Y-axis distance with respect to the side surface of the spindle 14 in rotation are arranged in opposed relations to each other in X and Y directions, respectively, on the inner surface of the frame unit 44. Further, a Z-axis distance sensor 50 for measuring the Z-axis distance with respect to the end surface of the spindle 14 in rotation is arranged on the upper surface of the support portion 46.

Using a method similar to that for the first spindle reference position measuring unit 28 described above, the distance between the side surface and the end surface of the spindle 14 and each of the distance sensors 48a, 48b, 48c, 48d, 50 is measured during the machining process with the spindle 14 in rotation, and the resulting measurements are output to the calculating unit 24. The calculating unit 24 calculates the displacement of the center position of the end surface of the spindle 14 based on the measurements, and outputs it to the correcting unit 22. The correcting unit 22 generates a correction value based on the displacement of the center position of the end surface of the spindle 14 with respect to the spindle housing.

According to the second embodiment, the displacement of the cutting edge position of the tool T is not measured during the machining process. Since the absolute value of the thermal elongation of the spindle 14 is large as compared with the thermal elongation of the tool T, however, the machining accuracy can be improved also by measuring the thermal elongation of the spindle 14 and updating the correction value during the machining process. Also, according to the second embodiment, the two pairs of the X-axis distance sensors 48a to 48d for measuring the X-axis distance with respect to the side surface of the spindle 14 in rotation and the two pairs of Y-axis distance sensors for measuring the Y-axis distance thereof are provided as described above. Nevertheless, one instead of two pairs of such sensors may be provided. Also, as shown in FIG. 1, the distance sensors for measuring the distance with respect to the side surface of the spindle 14 in rotation may be arranged only on one side of the spindle 14. As another alternative, a single instead of a plurality of distance sensors may be provided. In the case where the two pairs of the X-axis distance sensors 48a to 48d and the two pairs of the Y-axis distance sensors are arranged along Z-axis, on the other hand, the change in the inclination or offset of the spindle 14 with respect to the spindle housing can be measured.

In the first and second embodiments, the tool edge position measuring unit 30 may be done without, and the tool edge position can be measured with each sensor of the first spindle reference position measuring unit 28 with the tool rotation stopped. In this case, the first spindle reference position measuring unit makes up the position measuring means described in claim 17 appended hereto.

The embodiments described above assume that the workpiece W is accurately set in position on the machine coordinate system on the table 16. In the third embodiment of the invention described below, however, the arrangement of the workpiece W on the machine coordinate system is also taken into account.

According to the third embodiment, a workpiece reference position measuring unit 34 (FIG. 1) is provided for measuring the reference position of the workpiece W with respect to the spindle 14. The workpiece reference position measuring unit 34 includes an axial portion 34a extending in longitudinal direction and a measuring probe 34b arranged at the forward end of the axial portion 34a. The axial portion 34a of the workpiece reference position measuring unit 34 is adapted to be mounted in a tool mounting hole (not shown) of the spindle 14. As indicated by a two-dot chain in FIG. 1, the axial portion 34a is mounted in the tool mounting hole according to a procedure similar to that for automatic tool change. The spindle unit 12 is moved along X-, Y- and Z-axes relatively to the workpiece W fixed on the table 16, and the measuring probe 34b is brought into contact with a predetermined reference position of the workpiece W thereby to measure the relative positions of the workpiece W and the spindle 14. The reference position of the workpiece W is not necessarily located at a specified point on the workpiece W, but may include, for example, predetermined three planes perpendicular to X-, Y- and Z-axes, respectively, with the spindle unit 12 moved along X-, Y- and Z-axes. In the case where the workpiece W is set in position with respect to the table 16 by bringing it into contact with the positioning means, i.e. what is called a locator accurately set in a predetermined position on the table 16, the reference positions of the workpiece W may be predetermined reference positions of the locator, e.g. three planes thereof perpendicular to the X-, Y- and Z-axes, respectively.

The workpiece reference position measuring unit 34 is a contacting displacement measuring instrument similar to the tool edge position measuring unit 30, and has the measuring probe 34b thereof arranged displaceably with respect to the axial portion 34a. The measuring probe 34b, when coming into contact with the reference position of the workpiece W, is displaced in the direction opposite to the direction in which the spindle unit 12 moves, and an electrical signal corresponding to the particular displacement is sent out every moment to the operation command unit 20c and the calculating unit 24. The signal that has been sent out to the operation command unit 20c functions as a skip signal. The operation command unit 20c sends out to the axial motion command unit 20d a X-Y-Z feed rod motor stop command thereby to stop the axial movement of the spindle unit 12. The calculating unit 24 calculates the value of the reference position of the workpiece relative to the reference position of the machine coordinate system based on the displacement of the measuring probe 34b, the coordinate of the measuring probe 34b on the machine coordinate system determined by the X-Y-Z position reading unit 18 and the center coordinate $O_{CS}$ of the end surface of the spindle 14 explained in the embodiments described above. At the same time, the calculating unit 24 determines the value of the position of the edge of the tool mounted on the spindle relative to the reference position of the workpiece based on the value of the reference position of the workpiece relative to the reference position on the machine coordinate system described above, the value of the reference position of the spindle relative to the reference position on the machine coordinate system described above and the value of the reference position of the tool edge relative to the reference position of the spindle. The value of the relative position of tool edge thus determined is sent out to the correcting unit 22. The correcting unit 22 generates a correction value based on this value and sends it to the operation command unit 20c.

Next, a detailed explanation will be given of a method and an apparatus for measuring the coordinate position of the cutting edge of the tool T using the tool edge position measuring unit 30 according to still another embodiment with reference to FIGS. 8, 9 and 10.

Figure 8:
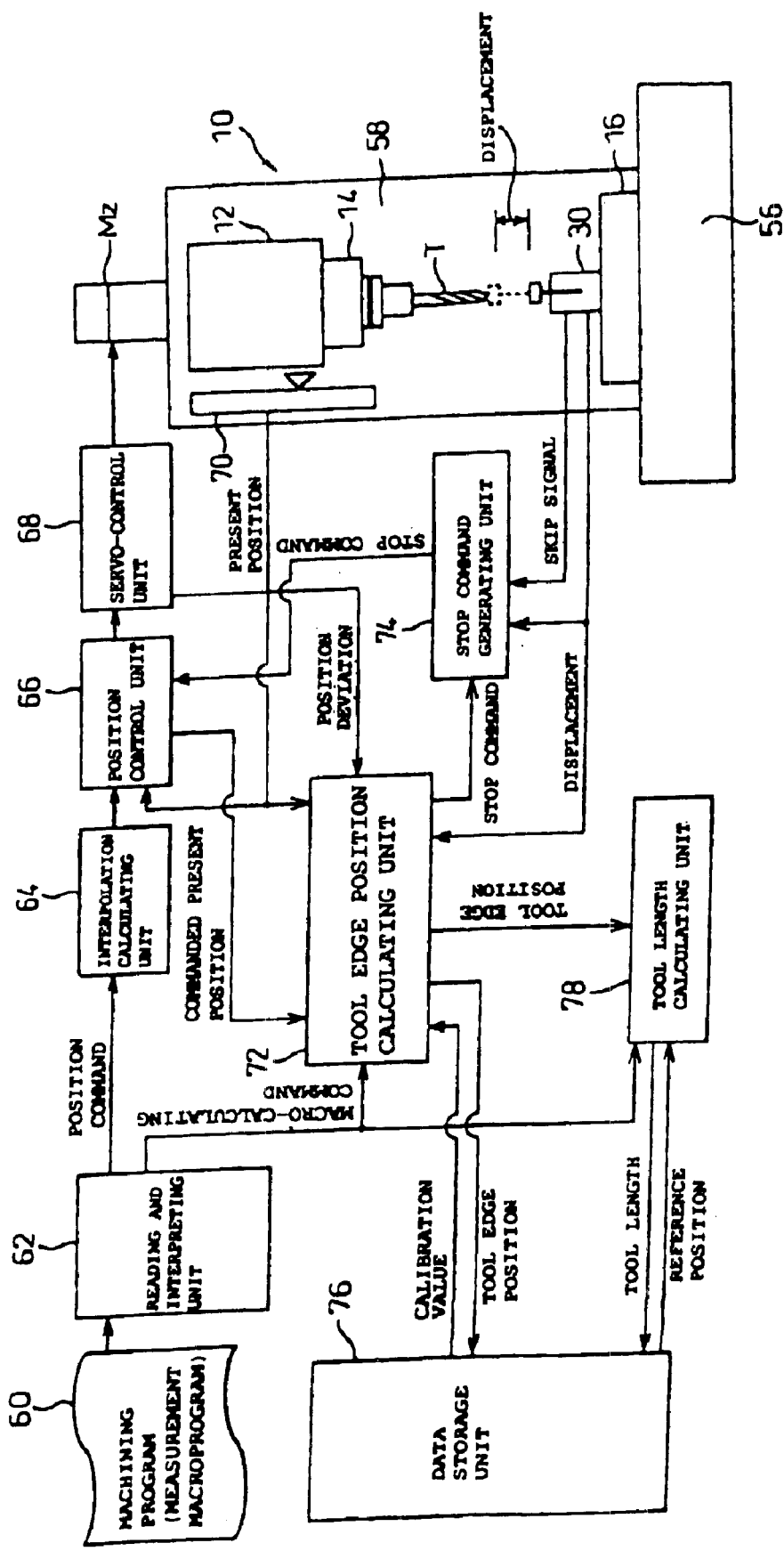
FIG. 8 is a block diagram of a measuring apparatus for measuring the position of the cutting edges of a tool in Z-axis and the tool length according to an embodiment of the invention.
Figure 9A:
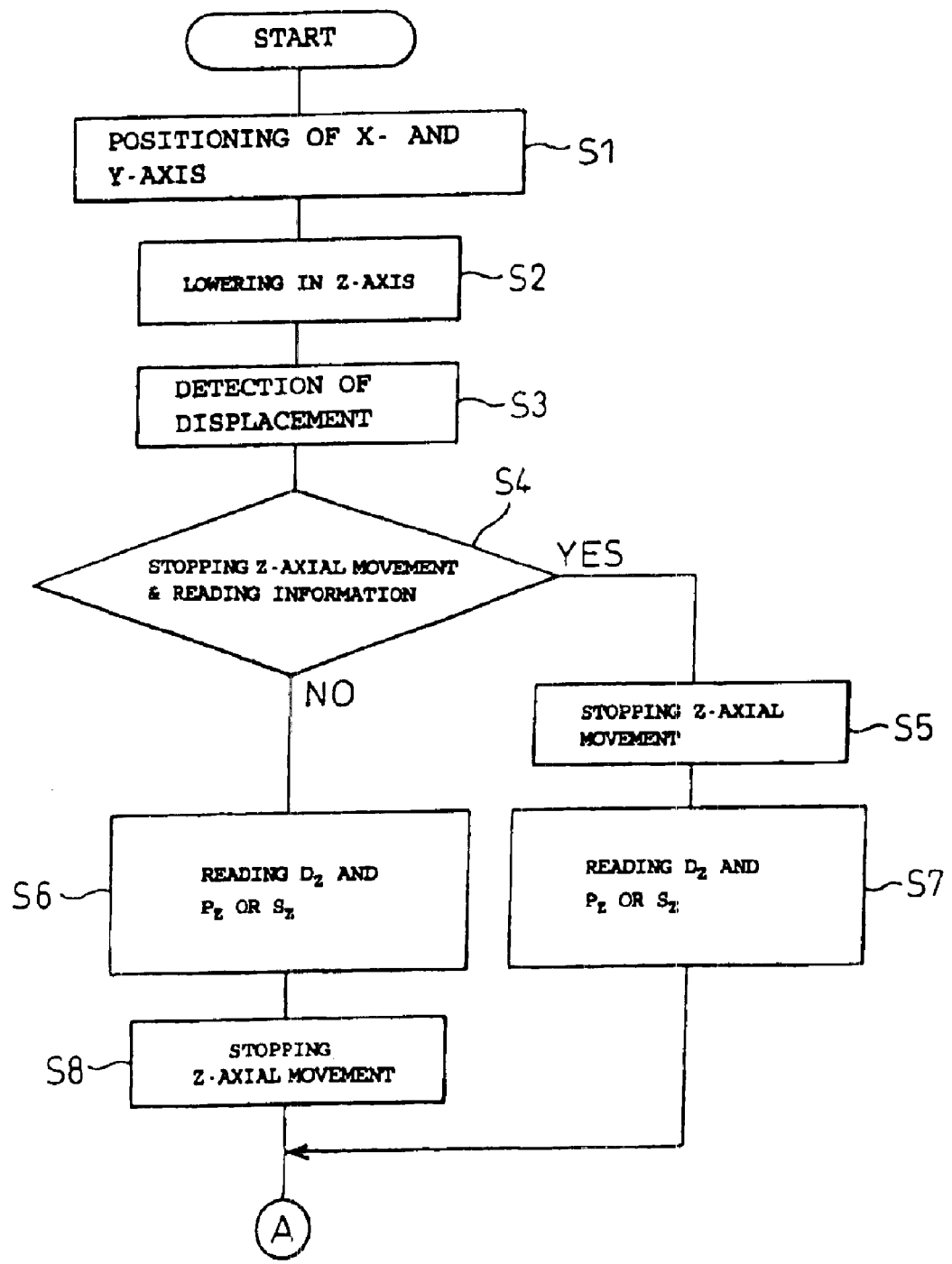
FIG. 9A is a flow chart showing an operation for measuring the position of the cutting edges of a tool in Z-axis and the tool length according to an embodiment of the invention.
Figure 9B:
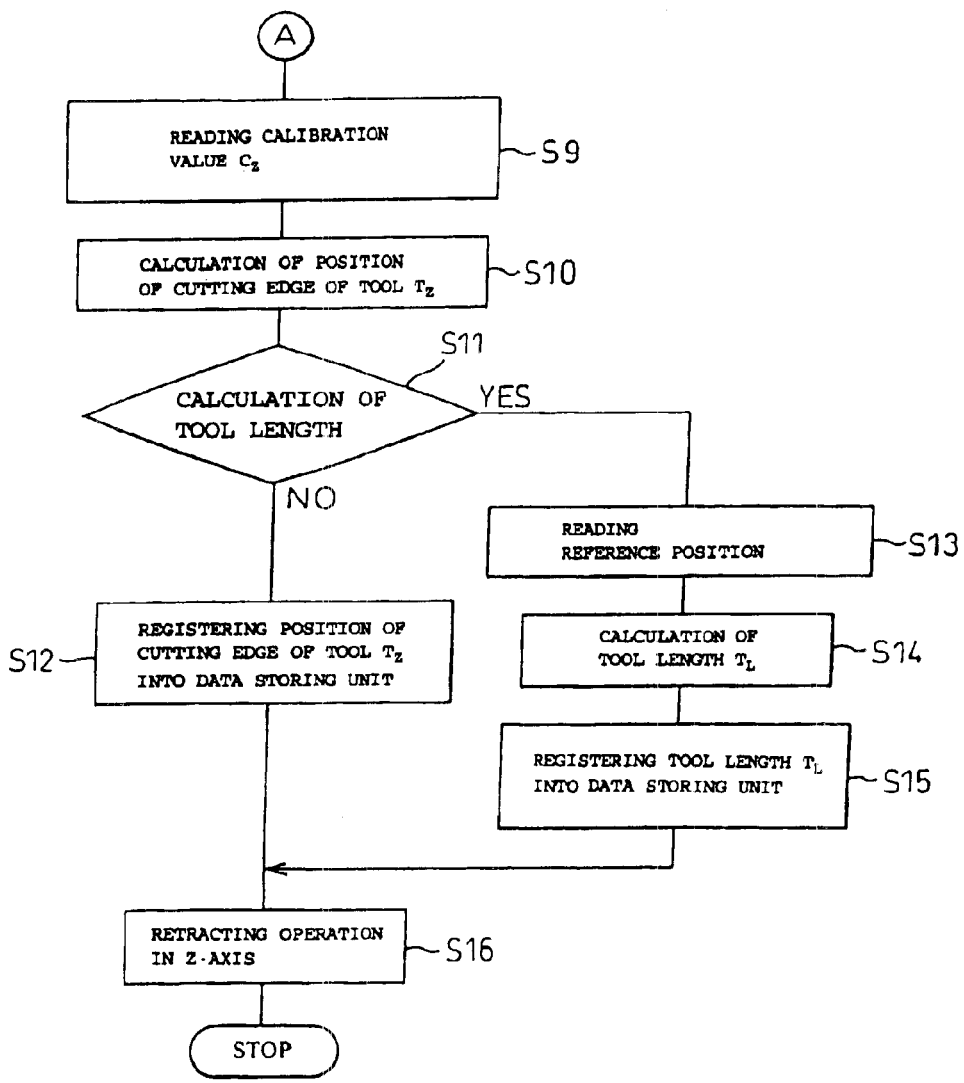
FIG. 9B is a flow chart showing an operation for measuring the position of the cutting edges of a tool in Z-axis and the tool length according to an embodiment of the invention.

FIG. 8 is a block diagram showing a configuration for measuring the edge position of the tool T along Z-axis using the tool edge position measuring unit 30, and FIGS. 9A, 9B flowcharts showing the operation of measuring the tool edge position and the length of the tool T along Z-axis.

In the machine tool 10 shown in FIG. 8, the table 16 for fixing the workpiece w is arranged movably in a horizontal X-Y plane by X- and Y-feed motors (not shown) on the upper surface of a bed 56. The spindle unit 12 includes the spindle 14 having mounted the tool T thereon and supported rotatably in the spindle housing. The spindle unit 12 is mounted on the front surface of a column 58 erected on the bed 56 movably by the Z-axis feed motor $M_Z$ along Z-axis perpendicular to the X-Y plane. The Z coordinate of the spindle 14 is read by a digital scale 70. The tool edge position measuring unit 30 is fixed in opposed relation to the spindle 14 on the upper surface of the table 16. The tool edge position measuring unit 30 is a contacting or non-contacting displacement sensor capable of measuring the amount of displacement. An example of the tool edge position measuring unit of contacting type is an optical or magnetic digital scale or a differential transformer. An example of the tool edge position measuring unit of non-contacting type is of a type using laser, electrostatic capacitance or eddy current. A displacement sensor of contacting type will be explained below as an example.

First, a measurement macroprogram 60 for measuring the edge position of the tool T along Z-axis is decoded by a reading and interpreting unit 62 of the NC device, so that the tool T mounted on the spindle 14 is set in position at the X-Y coordinate position just above the tool edge position measuring unit 30 (step S1). Then, the Z-axis feed motor $M_Z$ is driven, and the spindle unit 12 begins to move down along Z-axis at a predetermined speed (step S2). These operations are performed according to a well-known procedure in which the position command sent out of the reading and interpreting unit 62 flows through an interpolation calculating unit 64, a position control unit 66 and a servo-control unit 68 of the NC device. The present position $S_Z$ along Z-axis detected by the digital scale 70 is fed back to the position control unit 66.

On the other hand, a macro calculation command is sent out from the reading and interpreting unit 62 to the tool edge position calculating unit 72 and the tool length calculating unit 78. The macro calculation command contains a signal for determining whether the displacement output value and the Z coordinate of the tool edge position measuring unit 30 value are read after stopping the operation along Z-axis or during the operation along Z-axis before stopping it. As tool edge position measuring unit 30 begins to detect the displacement in step S3, the displacement amount $D_Z$ is sent out to the tool edge position calculating unit 72. In the case where the displacement output value and the Z coordinate position are read after stopping the operation along Z-axis (YES in step S4), a Z-axis stop command is issued to the position control unit 66 through a stop command generating unit 74 by a skip signal generated from the tool edge position measuring unit when reaching a predetermine output value (step S5). With the Z-axis operation stopped in this way, the displacement amount $D_Z$ detected from the tool edge position measuring unit 30 and the commanded present position $P_Z$ from the position control unit 66 or the present position $S_Z$ from the digital scale 70 is read by the tool edge position calculating unit 72 (step S6).

In the case where the answer in step S4 is NO, the process proceeds to step S7 where the tool edge position calculating unit 72 simultaneously reads the displacement amount $D_Z$ detected from the tool edge position measuring unit 30 and the commanded present position $P_Z$ from the position control unit 66 or the present position $S_Z$ from the digital scale 70 (step S7). After that, a stop command is issued from the stop command unit 74 to the position control unit 66 thereby to stop the operation along Z-axis (step S8). Assume that the commanded present position $P_Z$ from the position control unit 66 is employed as a coordinate position on the machine coordinate system. The tool edge position calculating unit 72 reads the calibration value $C_Z$ measured and stored in advance in the data storage unit 76 (step S9), and using the displacement amount $D_Z$ and the commanded present position $P_Z$ read earlier, the coordinate position $T_Z$ of the tool edge is calculated according to the following equation (step S10)

$$T_Z = P_Z + D_Z + C_Z$$

In the case where the macro calculation command includes no demand to calculate the tool length (NO in step S11), the value of the coordinate position $T_Z$ of the tool edge is registered in the data storage unit 76 (step S12). In the case where the macro calculation command contains the demand to calculate the tool length (step YES in step S11), on the other hand, the reference position $S_P$ measured and stored in advance in the data storage unit 76 is read by the tool length calculating unit 78 (step S13). The tool edge coordinate position $T_Z$ calculated earlier is read from the tool edge position calculating unit 72, and the tool length TL is calculated from the following equation (step S14)

$$TL = T_Z - S_P$$

The tool length thus calculated is registered in the storage unit 76 (step S15). The reference position information $S_P$ is determined in advance by a method similar to the above-mentioned method of calculating the coordinate position, in which the end surface of the spindle or the forward end surface of a master piece of a known length mounted on the spindle 14 is brought into contact with the tool edge position measuring unit 30. The reference position information $S_P$ thus determined is stored in the data storage unit 76.

After that, the Z-axis operates to come off from the tool edge position measuring unit 30 (step S16), thereby ending the series of operation for measuring the coordinate position of the tool edge and the tool length.

The tool edge position $T_Z$ and the tool length TL registered in the data storage unit 76 are employed as a correction value for the NC program or an offset value of the tool length for machining the workpiece with the tool T, and sent out to the operation command unit 20*c* through the correcting unit 22 shown in FIG. 1.

In step S63, the commanded present position $P_Z$ is employed as the coordinate position of the tool edge. The result of a higher accuracy can be obtained, however, by receiving the position deviation from the servo-control unit 68 and employing the sum of the commanded present position $P_Z$ and the position deviation as a coordinate position of the tool edge.

The tool edge position is measured before and after machining the workpiece, and the difference is calculated thereby to determine the amount of tool wear in longitudinal direction.

In the method described above, a displacement sensor such as the tool edge position measuring unit 30 is disposed on the table 16 to measure the position along Z-axis of the tool edge on the spindle 14 in relative motion with the table or the reference surface of the spindle end surface or the master piece. The position along X and Y axes can also be measured by a similar method. An example application of measurement of the position along X and Y axes is to measure the edge diameter of the tool T. Two diametrical positions of the tool are measured by a displacement sensor displaceable along X or Y-axis, and the difference is calculated to determine the tool edge diameter. In that case, the calibration data (calibration value) is determined in advance as well known using a master piece of a known diameter. Alternatively, the amount of tool wear along the too diameter can be determined by measuring the tool edge diameter before and after machining the workpiece and calculating the difference.

As another alternative, a displacement sensor is arranged on the spindle 14 and brought into contact with the reference surface of the workpiece on the table 16, the reference surface of the workpiece fixture and the reference surface of the table 16 to measure the X, Y or Z position of these reference surfaces. As an example of the application, a step or distance formed between two surfaces of the workpiece can be determined by calculating the position difference between the surfaces measured.

Further, it is easily understood that the invention is not limited to the measurement for the machine tool, but is applicable also to such a machine as a three-dimensional measuring instrument, a robot or a tool presetter with the component members relatively moved to each other. In such a case, the coordinate position of a measured portion of an object to be measured can be determined by calculations from the output value of a displacement sensor (displacement detection means) and the coordinate position on the machine coordinate system. Especially, with the tool presetter, which measures the length and diameter of a tool used in an NC machine tool in advance and registers the result in an NC device, the aforementioned method of measuring the tool length and the tool edge diameter of the machine tool is directly applicable. The method of measuring the length and diameter of the tool in the presetter will not be described.

It is also possible to realize a machine tool and a method of machining a workpiece using such a machine tool, which has the functions of measuring the tool edge position, the tool length, the tool edge diameter, the amount of tool wear, the coordinate position of the workpiece portion to be measured and a work step.

The NC devices shown in FIGS. 1 and 8 are so related to each other that the program storage unit 20*a* corresponds and operates substantially similarly to the machining program 60 including a measurement macroprogram, the program analysis unit 20*b* to the reading and interpreting unit 62, the operation command unit 20*c* to the interpolation calculating unit 64, and the axial motion command unit 20*d* to the position control unit 66 and the servo-control unit 68.

As described above, according to this invention, the tool edge position with respect to the reference coordinate position is determined through two steps including a first step for measuring the reference portion of the spindle with respect to the reference position of the machine tool and a second step for measuring the tool edge position with reference to the reference portion of the spindle. The advantage of measuring the reference portion of the spindle in the first step, in which the position of a portion having a comparatively simple shape such as the end surface or the cylindrical side surface of the spindle or the master piece is measured, is that the measurement can be conducted while rotating the spindle at the same rotational speed as in the actual machining process. The reference position of the spindle displaced with a hysteresis can be measured with high accuracy periodically.

In the second step, on the other hand, the measurement of a higher accuracy can be achieved by stopping the spindle for measuring the position of the tool edge having a complicated shape. The tool edge position with respect to the reference coordinate position is determined by calculations from the result of measurement in these two steps, thereby making it possible to obtain the calculation result of a higher accuracy.

Also, the amount of thermal displacement of the spindle can be measured in the first step and the amount of tool wear and the tool mounting error on the spindle in the second step. In the conventional method in which the tool edge position is directly measured, unlike in the invention, the amount of thermal displacement of the spindle, the tool mounting error and the tool wear amount cannot be determined separately from each other. According to the invention, on the other hand, these amounts can be determined separately from each other, and therefore, it is easy to introduce a method for minimizing the displacement amount and the error amount.

In the actual machining process, it is important to determine the relative values between the reference position on the upper surface of the table and the tool edge position, and between the workpiece reference position and the tool edge position. These relative values are included in the relative value between the reference coordinate position and the tool edge position written in the appended claims. This is because of the necessity primarily to calibrate the reference position on the upper surface of the table and the reference position of the workpiece with respect to the reference coordinate position, i.e. to clarify the positions relative to the reference coordinate position.

Further, the change in the tool edge position at each moment can be corrected by continuously measuring the reference portion of the spindle with respect to the spindle housing during the machining process, thus contributing to an improved workpiece machining accuracy.

The output value of the displacement measuring means of contacting or non-contacting type and the coordinate position on the machine coordinate system associated with the particular output value are detected, and based on these two values, the coordinate position of a portion to be measured of an object of measurement is determined by calculations. Therefore, unlike in the conventional method of touch probe type for detecting the coordinate position at the moment of contacting, the method according to the invention has a higher measurement accuracy with the measurement accuracy not varied with the feed rate at the time of contacting. As a result, the displacement measuring means can be brought near to the portion to be measured at a maximum speed, thereby shortening the measurement time.

This basic measurement method is applicable to the reference portion of the spindle, the reference portion of the table, the tool edge, etc. Also, as an application, the tool length, the tool edge diameter, the tool wear amount, the workpiece step, etc. can be measured. A machine tool, a machining method and even a tool presetter having the measurement method and the measuring unit described above have been realized, thereby effectively improving the workpiece machining accuracy.

What is claimed is:

1. An apparatus for measuring the position of a cutting edge of a tool mounted to a spindle of an NC machine tool, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference position of the spindle; and calculation means for calculating the coordinate position of the cutting edge of a tool in the coordinate system on the basis of the coordinate position of the reference position in the coordinate system measured by the feed shaft position reading means and the first shaft reference position measuring means and the position of the cutting edge of the tool relative to the reference position of the spindle measured by the feed shaft position reading means and the tool cutting edge position measuring means.

2. An apparatus for measuring the position of a cutting edge of a tool according to claim 1, wherein the tool cutting edge position measuring means comprises a contacting or non-contacting displacement measuring sensor.

3. An apparatus for measuring the position of a cutting edge of a tool according to claim 1, wherein the reference position of the spindle is provided on the end of the spindle or on a masterpiece which has known dimensions and is attached to the spindle.

4. An apparatus for measuring the position of a cutting edge of a tool according to claim 1, wherein the first shaft reference position measuring means and/or the tool cutting edge position measuring means includes contacting or non-contacting displacement measuring means which can measure the axial displacement in least one axial direction of X-, Y- and Z-axis whereby the coordinate position of the reference position of the spindle or the cutting edge of the tool relative to the reference position of the displacement measurement means in the coordinate system can be calculated on the basis of the output values of the displacement measuring means and the feed shaft position reading means at a predetermined measurement timing after moving the reference position of the spindle or the cutting edge of the tool into the measurement range of the displacement measuring means through the relative movement along a direction same as a measurable direction of the displacement measuring means.

5. An apparatus for measuring the position of a cutting edge of a tool according to claim 4, wherein the output value of the feed shaft position reading means is selected from the value of the indication of a feed shaft position reading means provided on a feed shaft, an NC command value for a feed shaft or a position obtained on the basis of an NC command value for a feed shaft added with a position deviation obtained from a servo-control unit.

6. An apparatus for measuring the position of a cutting edge of a tool mounted to a spindle of an NC machine tool, comprising:

feed shaft position reading means for reading the coordinate position of the coordinate system of the machine tool;

position measuring means, provided on a constitutional member movable relative to the spindle, for measuring the coordinate position of the reference position of the spindle in the coordinate system and the position of a cutting edge of a tool relative to the reference position of the spindle; and calculation means for calculating the coordinate position of the cutting edge of a tool in the coordinate system on the basis of the coordinate position of the reference position of the spindle in the coordinate system measured by the feed shaft position reading means and the position measuring means and the position of the cutting edge of the tool relative to the reference position of the spindle measured by the feed shaft position reading means and the position measuring means.

7. An apparatus for measuring the position of a cutting edge of a tool mounted to a spindle of an NC machine tool, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

second shaft reference position measuring means, provided on a spindle housing of the NC machine tool, for measuring the changes in the position of the reference position of the spindle relative to the spindle housing during the rotation; and calculation means for calculating the coordinate position of the cutting edge of a tool in the coordinate system during the rotation of the spindle on the basis of the coordinate position of the reference position of the spindle in the coordinate system measured by the feed shaft position reading means and the first shaft reference position measuring means, the position of the cutting edge of the tool relative to the reference position of the spindle measured by the feed shaft position reading means and the tool cutting edge position measuring means and the changes in the position of the reference position of the spindle during the rotation measured by the second shaft reference position measuring means.

8. A machine tool for machining a workpiece with a numerically controlled relative movement between a spindle to which a tool is mounted and a table to which the workpiece is fixed, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

calculation means for calculating the coordinate position of the cutting edge of a tool in the coordinate system on the basis of the coordinate position of the reference position of the spindle in the coordinate system measured by the feed shaft position reading means and the first shaft reference position measuring means and the position of the cutting edge of the tool relative to the reference position of the spindle measured by the feed shaft position reading means and the tool cutting edge position measuring means, and correcting means for correcting the numeric control command on the basis of the coordinate position of the cutting edge of a tool in the coordinate system calculated by the calculating means.

9. A machine tool for machining a workpiece with a numerically controlled relative movement between a spindle to which a tool is mounted and a table to which the workpiece is fixed, comprising:

feed shaft position reading means for reading the coordinate position of the coordinate system of the machine tool;

first shaft reference position measuring means, provided on a constitutional member movable relative to the spindle, for measuring the coordinate position of the reference position of the spindle in the coordinate system;

tool cutting edge position measuring means, provided on a constitutional member movable relative to the spindle, for measuring the position of a cutting edge of a tool relative to a reference surface of the spindle;

workpiece reference position measuring means for measuring the coordinate position of the reference position of the workpiece in the coordinate system;

calculation means for calculating the position of a cutting edge of a tool relative to the reference position of the workpiece on the basis of the coordinate position of the reference position of the spindle in the coordinate system measured by the feed shaft position reading means and the first shaft reference position measuring means the position of the cutting edge of the tool relative to the reference position of the spindle measured by the feed shaft position reading means and the tool cutting edge position measuring means and the coordinate position of the reference position of the workpiece in the coordinate system measured by the feed shaft position reading means and the workpiece reference position measuring means; and correcting means for correcting the numeric control command on the basis of the position of a cutting edge of a tool relative to the reference position of the workpiece calculated by the calculating means.

* * * * *